United States Patent [19]
Chen

[11] Patent Number: 6,118,793
[45] Date of Patent: Sep. 12, 2000

[54] METHOD FOR ADJUSTING INTER-FRAME GAP IN RATIO

[75] Inventor: Aphrodite Chen, Hsinchu, Taiwan

[73] Assignee: Accton Technology Corporation, Hsinchu, Taiwan

[21] Appl. No.: 09/209,687

[22] Filed: Dec. 11, 1998

[30]     Foreign Application Priority Data

Apr. 10, 1998  [TW]  Taiwan ................................. 87105429

[51] Int. Cl.$^7$ ...................................................... H04J 3/16
[52] U.S. Cl. ........................... 370/470; 370/445; 370/461
[58] Field of Search ..................................... 370/470, 229,
370/230, 235, 242, 252, 257, 445, 447,
448, 451, 453, 458, 461, 462, 508, 516,
517, 519, 450, 454, 452, 456, 457, 460,
468

[56]         References Cited

U.S. PATENT DOCUMENTS

| | | | |
|---|---|---|---|
| 5,404,353 | 4/1995 | Ben-Michael et al. ................. | 370/401 |
| 5,577,069 | 11/1996 | Lau et al. ................................. | 370/445 |
| 5,642,360 | 6/1997 | Trainin .................................... | 370/230 |
| 5,870,398 | 2/1999 | Kotchey ................................... | 370/445 |
| 5,894,559 | 4/1999 | Krishna et al. .......................... | 370/448 |

*Primary Examiner*—Douglas W. Olms
*Assistant Examiner*—Phirin Sam
*Attorney, Agent, or Firm*—Rosenberg, Klein & Lee

[57]         ABSTRACT

The present invention discloses a method for adjusting an Inter-Frame Gap (IFG) in a desired ratio. Based on the method, the lengths of the first part and the second part of an Inter-Frame Gap are adjusted in such a way that their increased amount or decreased amount are always approximately in a specified ratio. Better configuration of an IFG can thus be maintained all the time, and larger adjustable range of an IFG can thus be achieved.

8 Claims, 2 Drawing Sheets

$$B_7 = \begin{cases} 0: \text{increase} \\ 1: \text{decrease} \end{cases}$$

$$data = B_6 \times 2^6 + B_5 \times 2^5 + \ldots + B_1 \times 2^1 + B_0 \times 2^0$$

METHOD FOR ADJUSTING INTER-FRAME GAP IN RATIO

FIELD OF THE INVENTION

The present invention relates to local area network communication based on packet protocol, and particularly to a method for adjusting the Inter-Frame Gap of the communication.

BACKGROUND OF THE INVENTION

Local area network (LAN) is a communication system for interconnecting a plurality of independent stations in a relatively small area. The most popular topology to embody a LAN is a bus/tree network where the data transmission unit is usually called a frame or a packet, and where only one station is allowed to transmit data at one time because the bus/tree is shared by all the stations.

Many protocol standards have been developed by IEEE 802 committee, among which IEEE 802.3 is the standard defining the protocol for the bus/tree of a LAN, i.e., the bus/tree protocol that implements carrier sense multiple access with collision detection (CSMA/CD). The standard also defines a media access control (MAC) function for transmitting packets to and receiving packets from transmission media, and the structure of packets, as well as the interaction taking place between the MAC entities in the network. The standard specifies a medium attachment unit (MAU) connecting directly with physical medium and an attachment unit interface (AUI) which serves as the transmission media between a station and an associated MAU.

According to the conventional CSMA protocol, the station ready to send data keeps sensing if the transmission media is busy, and waits, in case it is busy, until the signal of the carrier is not sensed. The packet transmission begins after a time period of IFG (inter-frame gap) following the silence. FIG. 1 shows the relation between a packet and an IFG in time domain for transmission media, in which IFG 14 separates packet 10 and packet 12.

According to IEEE 802.3 standard, an inter-frame spacing is defined as follows:

The first part of an inter-frame spacing=duration of first portion of the inter-frame timing, ranging from 0 to ⅔ of the inter-frame spacing; and the second part of an inter-frame spacing=duration of the remainder of the inter-frame timing, equaling the result: inter-frame spacing−the first part of inter-frame spacing (subtracting the first part of inter-frame spacing from the inter-frame spacing).

A structure example based on the definition is shown in FIG. 2 where 16 is the first part which may range from 0 to ⅔ and 18 is the second part which is the remainder in the inter-frame spacing.

Practically IFG 14 in the figure must be adjusted from time to time. For example, an ethernet packet generator must afford to generate an IFG of adjustable length in order to adapt to the performance test of various ethernet products, and the MAUs made by different suppliers have different delays for carrier sensing loopback, thereby need adjustment of IFG to meet full-line speed of Ethernet operation (or capacity). According to prior arts, either network interface controller (NIC) or switch controller, allow very small range for adjustment, as can be seen from FIG. 3 where 16, the first part of the IFG is fixed, while 18, the second part of the IFG is the only part for adjusting, allowing the IFG with the second part equaling zero to be the shortest IFG. Although the length of the longest the second part of IFG is not limited, the second part of too much length will lead to the difficulty of maintaining the ordinary ratio between part1 and the second part of an IFG, which thereby limits the adjustable range of IFG 14. Clearly the conventional scheme thus implemented will bring about an unbalance, or even conflict the requirement of IEEE.

The practical implementation of a serial network interface (SNI) is taken for example to be illustrated as follows:

Assume IFG 14 is preset to be 99 bits of length with the first part of 66 bits and the second part of 33 bits. Also assume the associated configuration register is 8 bits long, with bit B7 indicating the increase or decrease of IFG length, and the other bits B0~B6 recording the increased amount (increment) or decreased amount (reduction) of IFG length adjustment, B7=0 indicating increase while B7=1 indicating decrease of IFG length. A variety of IFG configurations for various IFG lengths based on the above example is shown in Table 1 below where the 7 bits of the configuration register record the increment or reduction of IFG length, which ranges from 0 to 127, meaning that the second part of IFG can be increased by an increment of no more than 127 bits and can be decreased by a reduction of only 33 bits because it was preset to be 33 bits long and its feasible minimum length is zero, allowing a range of [99−33]~[99+127] bits for the IFG with maximum adjustable range of only [−33]~[+127]. It is therefore expected by those in the related fields to have a new method for adjusting IFG in such a way that it can adapt to various applications.

TABLE 1 conventional adjustment of IFG for SNI

| Content of Configuration register | The first part | The second part | IFG outputted by MAC |
|---|---|---|---|
| 0 | 66 | 33 | 99 |
| 1 | 66 | 33 + 1 | 99 + 1 |
| 2 | 66 | 33 + 2 | 99 + 2 |
| 3 | 66 | 33 + 3 | 99 + 3 |
| 4 | 66 | 33 + 4 | 99 + 4 |
| 5 | 66 | 33 + 5 | 99 + 5 |
| . | . | . | . |
| . | . | . | . |
| 127 | 66 | 33 + 127 | 99 + 127 |
| 128 | 66 | 33 | 99 |
| 129 | 66 | 33 − 1 | 99 − 1 |
| 130 | 66 | 33 − 2 | 99 − 2 |
| 131 | 66 | 33 − 3 | 99 − 3 |
| 132 | 66 | 33 − 4 | 99 − 4 |
| 133 | 66 | 33 − 5 | 99 − 5 |
| . | . | . | . |
| 162 | 66 | 33 − 33 | 99 − 33 |

SUMMARY OF THE INVENTION

An object of the present invention is to provide a method for configuring a ratio-adjustable IFG.

Another objects of the present invention are:

to provide a method for generating an IFG more reasonably and usably;

to increase the adjustable range of an IFG length; and to provide a method for easier adjusting of an IFG to meet the requirement of IEEE 802.3 standard.

According to the present invention, a method for configuring a ratio-adjustable IFG is provided to allocate adjustment increments (or reductions) in a preset ratio for the first part and the second part of an IFG in order to obtain an expected length ratio.

Because the adjustments for the first part and the second part are in ratio during an adjusting process, a reasonable and more usable IFG can be achieved by the present invention to match IEEE 802.3 standard and increase the adjustable range of an IFG.

An embodiment of the present invention for adjusting an IFG in ratio may be a method comprising the following steps: presetting a p1set and a p2set respectively as the length (number of bits) of the first part and the second part of an IFG; generating an adjustment amount number D to specify how many bits the length of the IFG is to be adjusted and an adjustment direction (increase or decrease) indicator F to specify if the length of the IFG is to be increased or decreased; calculating adjustment amount (number of bits) P1 and P2 respectively for the first part and the second part of the IFG where P1=2N and P2=N if D=3N, P1=2N+1 and P2=N if D=3N+1, while P1=2N+2 and P2=N if D=3N+2, here N is an integer; calculating the length of the IFG as follows: the length of the IFG=(p1set+P1)+(p2set+P2) if F indicates the adjustment is an increase, the length of the IFG=(p1set−P1)+(p2set−P2) if F indicates the adjustment is a decrease and N<p2set, while the length of the IFG=(p1set−2*p2set) if F indicates the adjustment is a decrease and N≧p2set, here * represents algebra multiplication.

The present invention may best be understood through the following description with reference to the accompanying drawings, in which:

DETAILED DESCRIPTION OF THE PREFERRED EMBODIMENTS

According to the present invention, a method for configuring a ratio-adjustable IFG is to allocate adjustment increments (or reductions) in a preset ratio for the first part and the second part of an IFG in order to obtain an expected length ratio.

Because the adjustments for the first part and the second part are in ratio during an adjusting process, a reasonable and more usable IFG can be achieved to match IEEE 802.3 standard and increase the adjustable range of an IFG.

Figure 1:
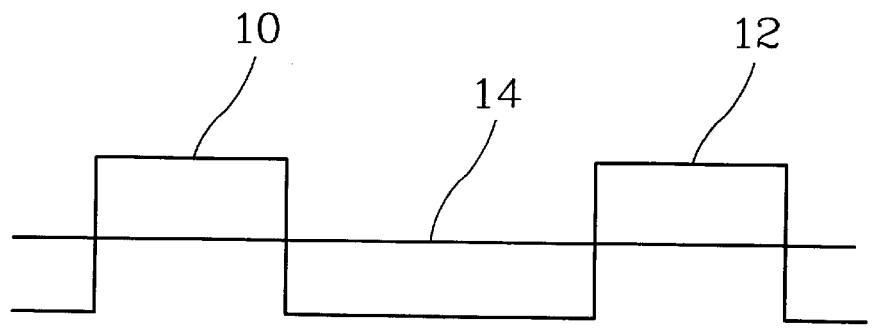
FIG. 1 shows the relation between an IFG and a packet in time domain for communication media.
Figure 2:
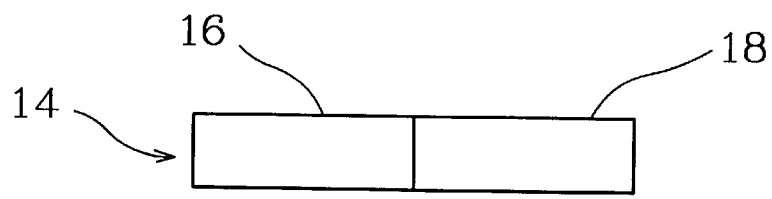
FIG. 2 shows the definition of an IFG according to IEEE 802.3 standard.
Figure 3:
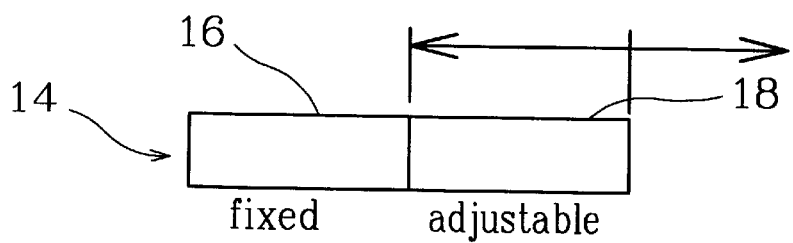
FIG. 3 shows a conventional method for adjusting an IFG.
Figure 4:
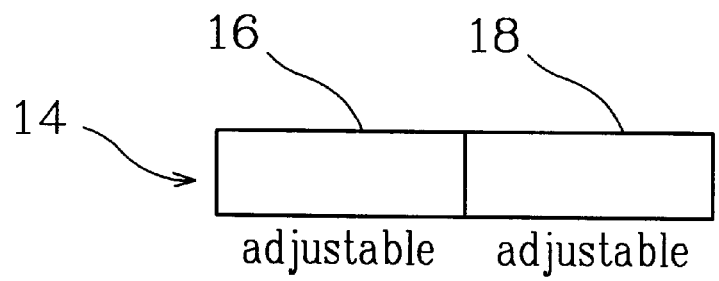
FIG. 4 shows a method for adjusting an IFG according to the present invention.

The basic principle of the present invention for adjusting an IFG is to adjust the first part and the second part of the IFG in an approximately fixed preset ratio (i.e., the ratio between the adjustment amounts for these two parts meets a preset ratio value which is determined according to application environment or requirement) so that the configuration of the IFG always matches IEEE 802.3 standard. Shown in FIG. 4 is a configuration of an IFG with length of its the first part and the second part adjustable.

Figure 5:
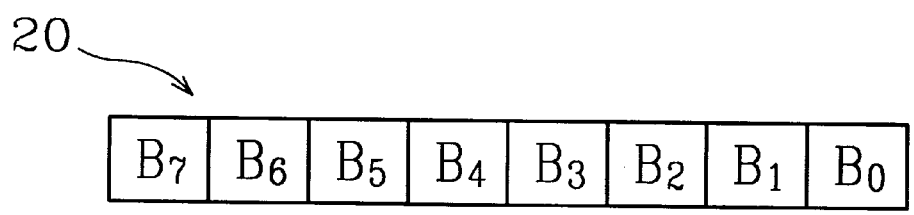
FIG. 5 shows a configuration register for adjusting an IFG according to the present invention.

Shown in FIG. 5 is a configuration register used for illustrating an embodiment of the present invention, where configuration register 20 has a memory capacity of 8 bits, with B7 as an adjustment direction indicator F indicating the adjustment direction (0 indicating increase and 1 indicating decrease) of the IFG, and B0~B6 representing D which indicates the adjustment amount (number of bits). $D=B6*2^6+B5*2^5+B4*2^4+B3*2^3+ \ldots +B0*2^0$ where * means algebra multiplication, + means algebra addition, $n^m$ means the m th power of n in algebra. B7=0 means adjustment amount is increase (positive) while B7=1 means decrease (negative).

Shown in FIG. 5 is a configuration register 20 with maximum adjustment amount of increasing/decreasing 127 bits.

Another scheme is to use a flag register as an adjustment direction indicator F for indicating the adjustment direction (increase or decrease), while use another register to indicate D (number of bits for adjustment).

The maximum length of the first part of IFG 14 is ⅔ (two thirds) of IFG 14 and the minimum is 0 according to IEEE 802.3. Assume D is divided by 3 to proceed the following steps:

if D=3N, let P1=2N and P2=N;

if D=3N+1, let P1=2N+1 and P2=N; and if D=3N+2, let P1=2N+2 and P2=N;

here N is an integer, P1 and P2 are respectively the adjustment amount of the first part and the second part of the IFG 14.

Following is detailed computation for the length of IFG. The lengths of the first part and the second part are preset to be p1set and p2set, i.e., they are normally p1 set and p2set when D=0 (there's no adjustment of IFG). It is usual p1set/p2set (ratio of p1set to p2set)=2 and the length of IFG=(p1set+P1)+(p2set+P2) when B7=0 (indicating increased adjustment amount).

when B7=1 (indicating decreased adjustment amount), consideration must be taken for that D (adjustment amount) may be bigger than preset length of IFG (p1set+p2set), i.e.,the adjustment amount to be decreased is bigger than (p1set+p2set) while the minimum length of IFG is 0 instead of a negative value, leading to two conditions:

condition 1: the length of IFG=(p1set−P1)+(p2set−P2) if N<p2set;

condition 2: the length of IFG=(p1set−2*p2set) if N≧p2set, here * represents algebra multiplication.

The method described above is summarized as can be seen from Table 2 and Table 3 below.

TABLE 2

| | allocation of adjustment amount | |
|---|---|---|
| Data | P1 | P2 |
| 3N | 2N | N |
| 3N + 1 | 2N + 1 | N |
| 3N + 2 | 2N + 2 | N |

TABLE 3

IFG as a result of the adjustment amount

|  | $B_7 = 0$ (increase) | $B_7 = 1$ (decrease) | |
| --- | --- | --- | --- |
|  |  | N < P2set | N ≧ P2set |
| IFG = | (P1set + P1) + (P2set + P2) | (P1set − P1) + (P2set − P2) | (P1set − 2P2set) |

The method based on the invention for IFG length adjustment enables the achievement of approximately maintaining (length of the first part)/(length of the second part)=2, i.e., the ratio of part1 to part2 is always about 2 regardless of the way of adjusting IFG 14, leading to fair and reasonable utilization of network resource.

Another feature of the method according to the invention is the increased adjustable range with 0 as its minimum and with its maximum determined by D. Based on the example of 8 bits of configuration register, the adjustable range of the IFG provided by the invention is about 3 times of that provided by prior arts.

Following is an example to embody the invention for SNI. Assume IFG 14 is preset to be 99 bits long with the first part 66 bits long and the second part 33 bits long, and configuration register 20 with capacity of 8 bits B7=0 represents adjustment amount increasing while B7=1 represent adjustment amount decreasing. The computation and resultant are shown in Table 4 as follows.

TABLE 4 adjustment of IFG for SNI according to the present invention

| Content of configuration register | The first part | The second part | IFG outputted by MAC |
| --- | --- | --- | --- |
| 0 | 66 | 33 | 99 |
| 1 | 66 + 1 | 33 | 99 + 1 |
| 2 | 66 + 2 | 33 | 99 + 2 |
| 3 | 66 + 2 | 33 + 1 | 99 + 3 |
| 4 | 66 + 3 | 33 + 1 | 99 + 4 |
| 5 | 66 + 4 | 33 + 1 | 99 + 5 |
| 6 | 66 + 4 | 33 + 2 | 99 + 6 |
| 7 | 66 + 5 | 33 + 2 | 99 + 7 |
| 8 | 66 + 6 | 33 + 2 | 99 + 8 |
| 9 | 66 + 6 | 33 + 3 | 99 + 9 |
| . | . | . | . |
| 127 | 66 + 85 | 33 + 42 | 99 + 127 |
| 128 | 66 | 33 | 99 |
| 129 | 66 − 1 | 33 | 99 − 1 |
| 130 | 66 − 2 | 33 | 99 − 2 |
| 131 | 66 − 2 | 33 − 1 | 99 − 3 |
| 132 | 66 − 3 | 33 − 1 | 99 − 4 |
| 133 | 66 − 4 | 33 − 1 | 99 − 5 |
| 134 | 66 − 4 | 33 − 2 | 99 − 6 |
| 135 | 66 − 5 | 33 − 2 | 99 − 7 |
| 136 | 66 − 6 | 33 − 2 | 99 − 8 |
| 137 | 66 − 6 | 33 − 3 | 99 − 9 |
| . | . | . | . |
| 224 | 66 − 64 | 33 − 32 | 99 − 96 |
| 225 | 66 − 65 | 33 − 32 | 99 − 97 |
| 226 | 66 − 66 | 33 − 32 | 99 − 98 |
| 227 | 66 − 66 | 33 − 33 | 99 − 99 |

According to this example, 7 bits in the configuration register records adjustment amount ranging from 0 to 127, thereby the maximum adjustment amount which can be increased is 127 bits while the minimum is 0 bit, therefore the range of the IFG is [99−99, 99+127], resulting in an adjustable range of [−99, 127] which is larger than conventional scheme, as can be seen from the example illustrated by Table 1. Obviously the bigger the length of the configuration register is, the bigger (the more flexible) the adjustable range is.

It is clear another schemes for different allocation ratio between the first part and the second part of an IFG may also be usable on the basis of similar or the same principle described above.

A preferred application of the present invention is in the field of a LAN based on IEEE 802.3, especially an Ethernet Network where either a switch, an NIC, or another network interfaces producing IFG may achieve better performance as a result of the method provided by the present invention.

While the invention has been described in terms of what are presently considered to be the most practical and preferred embodiments, it shall be understood that the invention is not limited to the disclosed embodiment. On the contrary, it is intended to cover various modifications and similar arrangements included within the spirit and scope of the following claims which are to be accorded with the broadest interpretation to encompass all modifications and similar structures based thereon.

What is claimed is:

1. A method of establishing a time period between an end of one data packet transmission on a transmission medium and transmission of another data packet defined as an Inter-Frame Gap (IFG), said IFG being divided into a first portion and a second portion, comprising the steps of:

sensing activity on the transmission medium to detect an end of a data packet transmission;

establishing an adjustment amount parameter D;

presetting an initial length of said first portion and said second portion of said IFG to respective values p1set and p2set;

computing an adjustment amount P1 for said first portion of said IFG and an adjustment amount P2 for said second portion of said IFG, where:

P1=2N and P2=N if said D=3N,

P1=2N+1 and P2=N if D=3N+1,

P1=2N+2 and P2=N if D=3N+2, where N is an integer;

establishing an adjustment direction parameter F;

computing an adjusted length A1 of said first portion of said IFG and an adjusted length A2 of said second portion of said IFG, where:

A1=p1set+P1 and A2=p2set+P2 if F represents a first value,

A1=p1set−P1 and A2=p2set−P2 if F represents a second value and N<p2set, and A1=p1set and A2=−2*p2set if F represents said second value and N≧p2set, where * represents algebraic multiplications computing said IFG time period, where IFG=A1+A2; and delaying transmission of a data packet by said IFG time period subsequent to said detection of an end of a data packet transmission.

2. A method of establishing a time period between an end of one data packet transmission on a transmission medium and transmission of another data packet defined as an inter-frame gap (IFG), said IFG being divided into a first portion and a second portion, comprising the steps of:

sensing activity on the transmission medium to detect an end of a data packet transmission;

presetting a initial length of said first portion and said second portion of said IFG to respective values p1set and p2set;

writing in a configuration register an adjustment amount parameter D and an adjustment direction parameter F;

reading said adjustment amount parameter D and said adjustment direction parameter F;

computing an adjustment amount P1 for said first portion of said IFG and an adjustment amount P2 for said second portion of said IFG, where:

P1=2N and P2=N if said D=3N,
P1=2N+1 and P2=N if D=3N+1,
P1=2N+2 and P2=N if D=3N+2,
where N is an integer;

computing an adjusted length A1 of said first portion of said IFG and an adjusted length A2 of said second portion of said IFG, where:

A1+A2=said inter-frame gap time period,
A1=p1set+P1 and A2=p2set+P2 if F represents a first value,
A1=p1set−P1 and A2=p2set−P2 if F represents a second value and N<p2set,
A1+A2=p1set−2p2set if F represents said second value and N≧p2set; and delaying transmission of a data packet by said IFG time period subsequent to said detection of an end of a data packet transmission.

3. A method of establishing a time period between an end of one data packet transmission on a transmission medium and transmission of another data packet defined as an Inter-Frame Gap (IFG), comprising the steps of:

sensing activity on the transmission medium to detect an end of a data packet transmission;

presetting a first portion and a second portion of said IFG to respective values p1set and p2set;

generating an adjustment amount parameter and an adjustment direction parameter;

computing an adjustment amount P1 of said first portion of said IFG and an adjustment amount P2 of said second portion of said IFG, the ratio between said P1 and said P2 equals a preset ratio value and said adjustment amount parameter=P1+P2;

computing said IFG time period according to said adjustment direction parameter, said P1, said P2, said p1set and said p2set; and delaying transmission of a data packet by said IFG time period subsequent to said detection of an end of a data packet transmission.

4. A method of establishing a time period between an end of one data packet transmission on a transmission medium and transmission of another data packet defined as an Inter-Frame Gap (IFG), comprising the steps of:

sensing activity on the transmission medium to detect an end of a data packet transmission;

presetting a first portion and a second portion of said IFG to respective values p1set and p2set;

providing a configuration register and storing an adjustment amount parameter and an adjustment direction parameter therein;

computing an adjustment amount P1 of said first portion of said IFG and an adjustment amount P2 of said second portion of said IFG, a ratio between said P1 and said P2 equals a preset ratio value and said adjustment amount parameter=P1+P2;

determining said IFG time period by computing a length of said first portion of said IFG and said second portion of said IFG according to said adjustment direction parameter, said P1, said P2, said p1set and said p2set; and delaying transmission of a data packet by said IFG time period subsequent to said detection of an end of a data packet transmission.

5. A method of establishing a time period between an end of one data packet transmission on an Ethernet transmission medium and transmission of another data packet defined as an inter-frame gap (IFG), said IFG being divided into a first portion and a second portion, comprising the steps of:

sensing activity on the transmission medium to detect an end of a data packet transmission;

presetting an initial length of said first portion and said second portion of said IFG to respective values p1set and p2set;

providing an adjustment amount parameter D and an adjustment direction parameter F;

computing an adjustment amount P1 of said first portion of said IFG and an adjustment amount P2 of said second portion of said IFG, where:

P1=2N and P2=N if said D=3N,
P1=2N+1 and P2=N if D=3N+1,
P1=2N+2 and P2=N if D=3N+2,
where N is an integer;

computing an adjusted length A1 of said first portion of said IFG and an adjusted length A2 of said second portion of said IFG, where:

A1+A2=a length of said inter-frame gap time period,
A1=p1set+P1 and A2=p2set+P2 if F represent a first value,
A1=p1set=P1 and A2=p2set−P2 if F represents a second value and N<p2set,
A1+A2=p1set−2p2set if F represents said second value and N≧p2set; and delaying transmission of a data packet by said IFG time period subsequent to said detection of an end of a data packet transmission.

6. A method of establishing a time period between an end of one data packet transmission in an Ethernet Network and transmission of another data packet defined as an inter-frame gap (IFG), comprising the steps of:

sensing activity on the transmission medium to detect an end of a data packet transmission;

presetting an initial length of a first portion and a second portion of said IFG to respective values p1set and p2set;

writing in a configuration register an adjustment amount parameter D and an adjustment direction parameter F;

reading said adjustment amount parameter D and said adjustment direction parameter F;

computing an adjustment amount P1 of said first portion of said IFG and an adjustment amount P2 of said second portion of said IFG, where:

P1=2N and P2=N if said D=3N,
P2=2N+1 and P2=N if D=3N+1,
P1=2N+2 and P2=N if D=3N+2,
where N is an integer;

computing an adjusted length A1 of said first portion of said IFG and an adjusted length A2 of said second portion of said IFG, where:

A1+A2=said IFG time period,
A1=p1set+P1 and A2=p2set+P2 if F represents a first value,
A1=p1set−P1 and A2=p2set−P2 if F represents a second value and N<p2set, A1+A2=p1set−2p2set if F represents said second value and N≧p2set; and delaying transmission of a data packet by said IFG time period subsequent to said detection of an end of a data packet transmission.

7. A method of establishing a time period between an end of one data packet transmission on a transmission medium of an Ethernet Network and transmission of another data packet defined as an Inter-Frame Gap (IFG), comprising the steps of:

sensing activity on the transmission medium to detect an end of a data packet transmission;

presetting a first portion and a second portion of said IFG to respective values p1set and p2set;

generating an adjustment amount parameter and adjustment direction parameter;

computing an adjustment amount P1 of said first portion of said IFG and an adjustment amount P2 of said second portion of said IFG, a ratio between said P1 and said P2 equals a preset ratio value and said adjustment amount parameter=P1+P2;

computing said IFG time period according to said adjustment direction parameter, said P1, said P2, said p1set and said p2set; and delaying transmission of a data packet by said IFG time period subsequent to said detection of an end of a data packet transmission.

8. A method of establishing a time period between an end of one data packet transmission on a transmission medium of an Ethernet Network and transmission of another data packet defined as an Inter-Frame Gap (IFG), comprising the steps of:

sensing activity on the transmission medium to detect an end of a data packet transmission;

presetting lengths of a first portion and a second portion of said IFG to respective values p1set and p2set;

providing a configuration register and storing an adjustment amount parameter and an adjustment direction parameter therein;

computing an adjustment amount P1 of said first portion of said IFG and an adjustment amount P2 of said second portion of said IFG, a ratio between said P1 and said P2 equals a preset ratio value and said adjustment amount parameter=P1+P2;

computing said IFG time period according to said adjustment direction parameter, said P1, said P2, said p1set and said p2set; and delaying transmission of a data packet by said IFG time period subsequent to said detection of an end of a data packet transmission.

* * * * *